United States Patent
Bul

(10) Patent No.: US 6,180,889 B1
(45) Date of Patent: Jan. 30, 2001

(54) ABRASION RESISTANT HIGH TEMPERATURE, FLEXIBLE THERMOCOUPLE CABLE

(75) Inventor: Robert Bul, Gainesville, FL (US)

(73) Assignee: Atkins Technical Inc., Gainesville, FL (US)

( * ) Notice: Under 35 U.S.C. 154(b), the term of this patent shall be extended for 0 days.

(21) Appl. No.: 09/294,150

(22) Filed: Apr. 20, 1999

Related U.S. Application Data

(60) Provisional application No. 60/092,529, filed on Jul. 13, 1998.

(51) Int. Cl.[7] .................................... H01B 7/00
(52) U.S. Cl. ........................................ 174/121 R
(58) Field of Search ................. 174/121 R, 120 SR, 174/121 A, 122 R, 116, 113 A; 136/230, 232, 233, 240, 242

(56) References Cited

U.S. PATENT DOCUMENTS

| | | | |
|---|---|---|---|
| 2,665,322 | * 1/1954 | MacDonald | 136/227 |
| 3,845,706 | * 11/1974 | Strimple et al. | 136/230 |
| 4,408,088 | * 10/1983 | Foote | 174/120 SR X |
| 4,484,018 | * 11/1984 | McLynn | 136/230 |

OTHER PUBLICATIONS

Hawley "Condensed Chemical Dictionary" pp. 470–471, 1981.*

* cited by examiner

*Primary Examiner*—Kristine Kincaid
*Assistant Examiner*—Chau N. Nguyen

(57) ABSTRACT

Abrasion resistant, high strength, high temperature, flexible thermocouple cable comprising two thermocouple wires, a pultrusion of a plurality of aramid fibers, sintered tape, shield, and a water impervious food safe fluoroelastomer outer insulation.

1 Claim, 1 Drawing Sheet

ABRASION RESISTANT HIGH TEMPERATURE, FLEXIBLE THERMOCOUPLE CABLE

Figure 1:
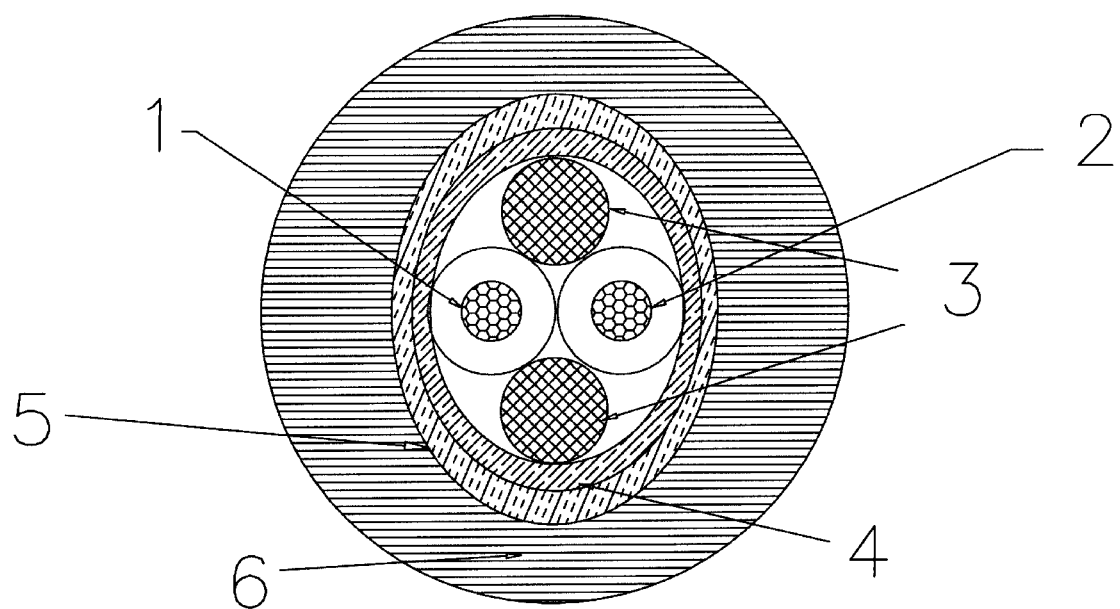
Figure 1:
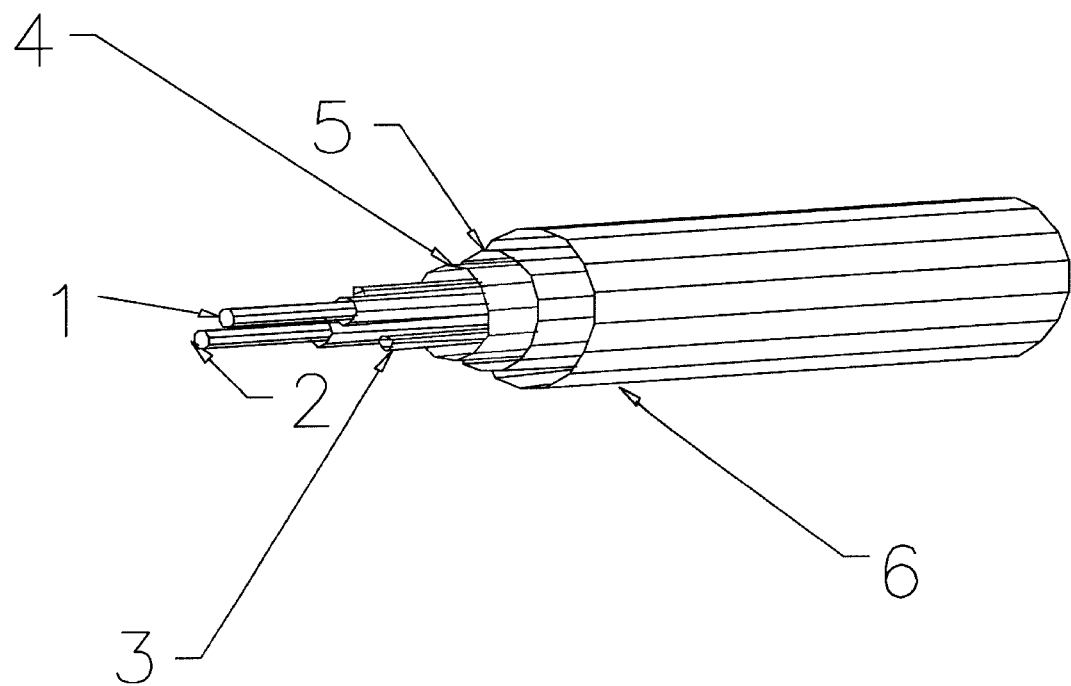

This application claims the benefit of U.S. Provisional Application No. 60/092,529 filed Jul. 13, 1998 now abandoned.

BACKGROUND OF INVENTION

During numerous processes temperature control is required. One of the ways to obtain the necessary data employs a system consisting of a thermocouple sensor connected to a hand held device (thermometer). A thermocouple cable used to connect sensor to a hand held device has to meet requirements being derived from the particular process parameters and by the typical way of handling and using this device.

Additionally, due to the way in which such hand held device is used, cable design should provide sufficient strength and flexibility in order to withstand continuous tension and bending. The outer insulation material should have sufficient cut-through and abrasion resistance necessary for cable reliability and therefore for reliable operation of the whole measurement system. A further requirement is that cable must have a small diameter and lightweight to facilitate the use.

BRIEF SUMMARY OF INVENTION

The invention consists of a thermocouple cable, particularly suited for use in food processing. Two individually insulated with fluoropolymer material thermocouple wires in twisted relation. The strain bearing function is provided by a pultrusion of a plurality of aramid fibers parallel to the centerline of the cable. Sintered fluoropolymer tape wrapped around thermocouple wires and aramid fibers and holds them together. Nickel plated copper or stainless steel shield that prevents outer insulation from stretching. A water impervious, high temperature resistant, flexible, abrasion resistant, food safe fluoroelastomer outer insulation pressure extruded around the wires, tape, shield and aramid fibers.

BRIEF SUMMARY OF SEVERAL VIEW OF THE DRAWING

A detailed description of one preferred embodiment of the invention is hereinafter described with particular references being made to the drawing in which:

FIG. 1 is a cross-sectional view of the cable.

DETAILED DESCRIPTION OF THE INVENTION

In the preferred embodiment, a thermocouple cable having two thermocouple wires (1, 2) individually insulated and being in parallel or twisted relation. A pultrusion of a plurality of aramid fibers (3) oriented parallel to the centerline of the cable. A concentric layer of sintered fluoropolymer tape (4) wrapped around the thermocouple wires and aramid members. A nickel-plated copper or stainless steel shield (5) braided concentrically over the thermocouple wires, aramid fibers and sintered tape. Water impervious, high temperature resistant, flexible, abrasion resistant, food safe fluoroelastomer outer insulation or jacket (6) pressure extruded around the wires, tape, shield and aramid fibers.

What is claimed is:

1. A thermocouple cable comprising: two thermocouple wires in parallel or twisted relation; a pultrusion of a plurality of aramid fibers parallel to the centerline of the cable; a concentric layer of sintered fluoropolymer tape wrapped over said thermocouple wires and said aramid members; a nickel-plated copper or stainless steel shield braided concentrically over said thermocouple wires, said aramid fibers and said sintered tape; a water impervious, high temperature resistant, flexible, abrasion resistant, food safe fluoroelastomer outer insulation pressure extruded over said wires, said aramid fibers, said sintered tape, and said shield.

* * * * *